United States Patent [19]
Swift

[11] Patent Number: 5,885,683
[45] Date of Patent: Mar. 23, 1999

[54] ELECTRICAL COMPONENT EXHIBITING CLEAN LASER CUT

[75] Inventor: Joseph A. Swift, Ontario, N.Y.

[73] Assignee: Xerox Corporation, Stamford, Conn.

[21] Appl. No.: 919,657

[22] Filed: Aug. 28, 1997

[51] Int. Cl.[6] .............................. B32B 3/02; B23K 26/00
[52] U.S. Cl. ..................... 428/88; 428/82; 428/297.4; 428/298.1; 428/299.1; 428/408; 361/221; 361/225; 219/121.65; 219/121.66; 219/121.85; 264/173.16; 264/257
[58] Field of Search ............................ 428/82, 88, 297.4, 428/298.1, 299.1, 408; 174/258; 361/230, 225; 219/121.65, 121.66, 121.85; 264/173.16, 257

[56] References Cited

U.S. PATENT DOCUMENTS

| | | | |
|---|---|---|---|
| 4,506,055 | 3/1985 | Bristowe et al. | 525/424 |
| 5,139,862 | 8/1992 | Swift et al. | 429/294 |
| 5,250,756 | 10/1993 | Swift et al. | 174/119 R |
| 5,270,106 | 12/1993 | Orlowski et al. | 428/295 |
| 5,599,615 | 2/1997 | Swift et al. | 428/293.1 |

OTHER PUBLICATIONS

Manufacturer publications regarding Modar™ resins and their uses (24 pages). Feb. 10th 1995.

*Primary Examiner*—William Krynski
*Assistant Examiner*—Cathy F. Lam
*Attorney, Agent, or Firm*—Zosan S. Soong

[57] ABSTRACT

There is disclosed an electrical component having at least one end for making electrical contact with another component, including a plurality of electrically conductive fibers in a matrix to provide a plurality of electrical point contacts at the at least one end of the electrical component, wherein the matrix is prepared from a composition composed of methyl methacrylate monomer and a trimer of hydroxyethyl methacrylate, diphenylmethane diisocyanate, and hydroxyethyl methacrylate, wherein the electrical component has a laser processed region at least substantially free of the matrix, wherein there is minimal residue generated by the laser processing in removing the matrix from the laser processed region.

8 Claims, 2 Drawing Sheets

FIG. 1
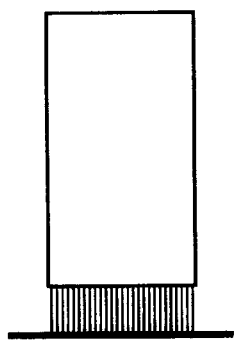
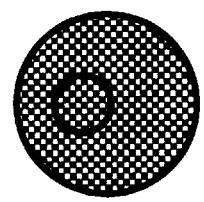
FIG. 2
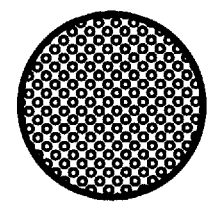
FIG. 3

FIG. 4
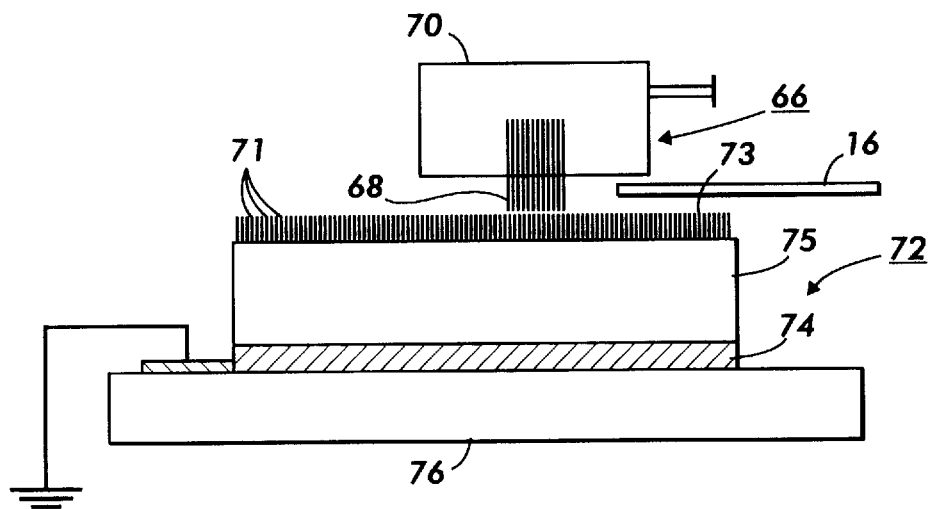
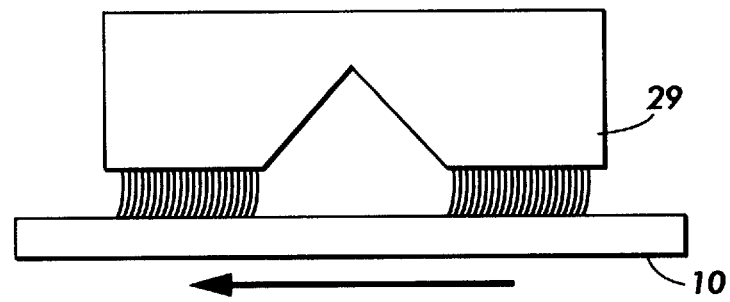
FIG. 5

ELECTRICAL COMPONENT EXHIBITING CLEAN LASER CUT

FIELD OF THE INVENTION

This invention relates to electrical components for making electrical contact with another component and electrical devices for conducting electrical current which include at least one of the electrical components. The electrical contact components and devices described herein, in addition to being well suited for low energy electronic/electrical signal level circuitry typified by contemporary digital and analog signal processing practices, are also particularly well suited to high power applications which require high contact power ratings and higher reliability which may rely on high bulk electrical and thermal conductivity and high surface densities of the fiber contact points in the contacts and may, for example, be used in power switching and power commutation applications.

BACKGROUND OF THE INVENTION

Typical of the type of machines which may use electrical contacts and devices are electrostatographic printing machines. In electrostatographic printing apparatus commonly used today, a photoconductive insulating member is typically charged to a uniform potential and thereafter exposed to a light image of an original document to be reproduced. The exposure discharges the photoconductive insulating surface in exposed or background areas and creates an electrostatic latent image on the member which corresponds to the image contained within the original document. Alternatively, a light beam may be modulated and used to selectively discharge portions of the charged photoconductive surface to record the desired information thereon. Typically, such a system employs a laser beam. Subsequently, the electrostatic latent image on the photoconductive insulating surface is made visible by developing the image with developer powder referred to in the art as toner. Most development systems employ developer which comprises both charged carrier particles and charged toner particles which triboelectrically adhere to the carrier particles. During development the toner particles are attracted from the carrier particles by the charged pattern of the image areas of the photoconductive insulating area to form a powder image on the photoconductive area. This toner image may be subsequently transferred to a support surface such as copy paper to which it may be permanently affixed by heating or by the application of pressure to form the desired copy.

In commercial applications of such printing machines it is necessary to distribute electrical power and/or logic signals to various sites within the machines. Traditionally, this has required conventional wires and wiring harnesses in each machine to distribute power and logic signals to the various functional elements in an automated machine. In such distribution systems, it is necessary to provide electrical connectors between the wires and components. In addition, it is necessary to provide sensors and switches, for example, to sense the location of copy sheets, documents, etc. Similarly, other electrical devices such as interlocks, and the like are provided to enable or disable a function. These electrical devices are usually low power operating at electronic signal potentials up to 5 volts and at currents in the milliamp regime. Further, many commercial applications employ electrical contact components and related devices that require use in higher power applications employing currents in the regime of 1–100 amps and voltages greater than 5 volts. The present invention is not limited to signal level currents or low potential applications and includes applications in higher power regimes requiring greater current carrying capacity.

Conventional laser processing of electrical components to produce, for example, a distributed filament contact component can result in a clean cut in the limited sense that all of the fibers are uniformly cut and that the length of all fibers projecting from the matrix are approximately the same, or alternatively, that all of the fibers are uniformly cut, are not jagged, and, all of the tips are on an equal plane with the matrix. However, conventional laser processing has been discovered to result in the generation of substantial chemical residue which appears as a contaminant on the electrical components which must be removed in a post laser processing procedure, thereby increasing the complexity and cost of the electrical component fabrication process. This residue is observed to exist in several different forms such as: a carbonaceous, solid powdery substance, (referred to herein as char), a tacky, tar-like, or glue-like resinous film (referred to herein as tacky film), and a rigid, hard crusting layer (referred to as crust). The residue has been observed to exist on the fiber tips, between the fibers, between the tip ends and the matrix, and, on the external surfaces of the composite for a significant distance, for example, 2 to 4 mm away from the cut region. We have observed problems associated directly with each of these forms of contaminant if they are not removed from the contact either during or after laser processing. For example, the tacky film is particularly problematic when it deposits upon the outer surfaces of the parts because it causes the parts to adhere together when stacked in magazine feeders for auto-feeding apparatus of an automated manufacturing process. The presence of tacky films necessitates that the parts are not permitted to contact other parts or nearby surfaces after laser processing, otherwise the parts will stick together, in effect, preventing the parts from being separated from one another without damage or breakage. Thus, in the absence of this invention, a complex and costly chemical removal of the tacky film at the point in the overall process immediately after laser processing would be required to enable efficient, automated handling of the parts. Likewise, the presence of even very small amounts of char or crust is found to contaminant the contact surface and adversely affect the electrical or mechanical functions of the resultant device. Thus, there is a need, which the present invention addresses, for new electrical component compositions where laser processing of the electrical component results in a clean cut in the broader sense that the generation of unwanted residue is eliminated or minimized and that the tips of the fibers regardless of whether they are on an equal plane with the matrix or extend for a distance from the matrix, are not covered with matrix resin or residue from the thermal decomposition of the resin.

Conventional electrical components are disclosed in Swift et aL, U.S. Pat. No. 5,599,615; Orlowski et al., U.S. Pat. No. 5,270,106; Swift et al., U.S. Pat. No. 5,250,756; and Swift et al., U.S. Pat. No. 5,139,862. In addition, Bristowe et al., U.S. Pat. No. 4,506,055, discloses carboxy modified vinyl ester urethane resins.

Swift et al., U.S. application. Ser. No. 08/868,390 (Attorney Docket No. D/97082), filed Jul. 3, 1997, now U.S. Pat. No. 5,843,567 discloses an electrical component containing magnetic particles, where there is described on page 13 an electrical component including Amoco T300™ carbon fiber sized with Amoco UC-309™ resin, MODAR 826HT™ as the matrix available from ICI, plus a small amount of a suitable lubricant such as polyethylene wax and a curing agent such as Noury PERCADOX 16N™.

There are also a number of manufacturer publications regarding MODAR™ resins and their uses (24 pages).

SUMMARY OF THE INVENTION

The present invention is accomplished in embodiments by providing an electrical component having at least one end for making electrical contact with another component, comprising a plurality of electrically conductive fibers in a matrix to provide a plurality of electrical point contacts at the at least one end of the electrical component, wherein the matrix is prepared from a composition including methyl methacrylate monomer and a trimer of hydroxyethyl methacrylate, diphenylmethane diisocyanate, and hydroxyethyl methacrylate, wherein the electrical component has a laser processed region at least substantially free of the matrix, wherein there is minimal residue generated by the laser processing in removing the matrix from the laser processed region.

There is also provided in embodiments an electrical device for conducting electrical current comprising two contacting components, at least one of the components having an axial direction and two ends and comprising a plurality of electrically conductive fibers in a matrix, the plurality of the fibers being oriented in the matrix in a direction substantially parallel in the axial direction of the component and being continuous from one end of the component to the other end to provide a plurality of electrical point contacts at each end of the component, wherein the matrix includes a composition polymerized from a methyl methacrylate monomer and a trimer of hydroxyethyl methacrylate, diphenylmethane diisocyanate, and hydroxyethyl methacrylate, wherein the electrical component has a laser processed region at least substantially free of the matrix, wherein there is minimal residue generated by the laser processing in removing the matrix from the laser processed region.

BRIEF DESCRIPTION OF THE DRAWINGS

Other aspects of the present invention will become apparent as the following description proceeds and upon reference to the Figures which represent preferred embodiments of the present invention:

FIG. 1 is an elevational view illustrating an electrical component having a brush structure formed by removal of the matrix from one end region to expose the individual fibers wherein the exposed fibers in the brush structure are relatively long compared to the fiber diameter and will behave as a brush-like mass when deformed.

FIG. 2 is an end view of the electrical component of FIG. 1.

FIG. 3 is a further enlarged view of the designated portion of the end view of FIG. 2, where there is illustrated the fibers in close packed array.

FIG. 4 is a sensor having a pair of oppositely disposed electrical components.

FIG. 5 is an enlarged view from the side of a photoconductor grounding brush in contact with a moving photoconductor surface.

Unless otherwise noted, the same reference numeral in different Figures refers to the same or similar feature.

DETAILED DESCRIPTION

The following terms and phrases have the indicated meanings:

"Electrical component" encompasses low, intermediate, and high current devices.

"Matrix" refers to a binder material.

"Fibrillation" and "fibrillated" refer to the process of selective removal of the matrix encasing the fibers of the electrical component. A substantial portion of the matrix, preferably all of the matrix, is removed by use of heat, generated by a laser, for example from an end region of the electrical component to form the fiber rich surface comprising the contact region. Thus, in embodiments, an end region of the electrical component is at least substantially free of the matrix, preferably totally free of the matrix, to form the fiber rich brush structure.

"Residue" refers to any form of undesirable contamination to the contact surface or nearby region of the electrical component resulting from laser processing; the term "residue" excludes matrix material unaltered by the laser in the laser processed region.

"Residue analysis" refers to the analytical evaluation of the type and amount of residue produced during laser processing by any of the following means; visual inspection, microscopic investigation (including electron microscopic investigation), and tactile sensing, or a combination thereof.

"Residue ranking" refers to the assignment of a qualitative or semi-quantitative numerical rating to indicate the amount or severity of residue contamination existing within the fibers, within the laser cut region, or upon the nearby surfaces of a laser processed specimen. For the residue rating system used herein, a numerical ranking ranging from 0 to 5 was adopted where 0 indicates the condition where no detectable level of residue existed in or near the laser cut region; at the other end of the scale, a ranking of 5 indicates the condition where the relative maximal amount of residue was found. Intermediate rankings, 1 through 4, reflect various increasing levels of residue with respect to the 0 (no residue) and 5 (maximal residue) levels such that a ranking of 1 would have less observable residue than a ranking of 2, while a 2 ranking would have less observable residue than 3, and so forth. By this ranking system, it is possible for more than one test specimen to exhibit the same numerical rating, particularly when a relatively large number of specimens, for example, more than 5, was being evaluated.

"Minimal residue" refers to a residue ranking of 0 or 1.

In accordance with the present invention, an electrical component is provided and a variety of electrical devices for conducting electrical current such as switches, sensors, connectors, interlocks, etc. are provided which are of greatly improved reliability, are of low cost and easily manufacturable and are capable of reliably operating at low contact loads in a wide variety of circuits. Typically these devices are low energy devices, using voltages within the range of millivolts to kilovolts and currents within the range of microamps to hundreds of milliamps but may also be used for high power applications with tens to thousands of amperes, for example. Although the present invention may be used in certain applications in the one to tens of amps region, it is noted that best results are obtained in high resistance circuitry where power losses attributable to the subject devices can be tolerated. It is also noted that these devices may be used in certain applications in the very high voltage region in excess of 10,000 volts, for example, where excessive heat is not generated or can be controlled to an accepted level. These devices are generally electronic in nature within the generic field of electrical devices meaning that their principle applications are in low to moderate energy and signal level circuits. Furthermore, it is possible for these electrical devices in addition to performing an electrical function to provide a mechanical or structural function, such as a column beam, lever arm, leaf or other type of spring, recesses, grooves, slides, snap fits, and the like. The above advantages are enabled through the use of a manufacturing process known generally as pultrusion and the fibrillation of at least one end region of the pultrusion.

According to the present invention, an electrical component is made by pultrusion or another suitable technique and an end region is fibrillated to create a fiber rich structure at one end which provides a densely distributed filament contact which is highly suited for electrical mating with another component across a separable interface. Both ends of the electrical component can be fibrillated to create a densely distributed filament contact at the two ends. By the term densely distributed filament contact it is intended to define an extremely high level of contact redundancy insuring electrical contact with another contact surface in that the contacting component has in excess of 1000 individual conductive fibers per square millimeter. In a preferred embodiment, with the use of a laser, for example, an industrial 500 watt $CO_2$ laser, the pultruded member can be cut into individual segments and heat fibrillated in a one step process. The laser cutting and fibrillating process provides a quick, clean, programmable process for producing a soft, compliant, fiber rich electrical contact which is of low cost, highly reliable, and long life. Likewise, this process produces contacts that generate low electrical noise, do not shed and can be machined like other solid materials and yet provides a long wearing, easily replaceable, and noncontaminating conductive contact. The laser process can be adjusted to cut and fibrillate deeply into or through the pultrusion material and has the capability of producing an electrical contact wherein the filaments of the brush structure have a length many times greater than their diameter and thereby provides a soft, resiliently flexible brush which behaves elastically when it is deformed thereby providing with the large number of filaments, the desired level of redundancy and with the large degree of resiliency, the softness desired in a long life, high reliability electrical contact. Alternatively, other adjustments to the laser process can produce a micro-like structure wherein the fibers of the contact surface have a length much shorter than five times the diameter of the fibers and provide a relatively hard, rigid contacting surface. In embodiments of the present invention, no, or little, matrix is removed from either end region of the electrical component where the matrix material extends to the ends of the component.

The pultrusion process generally consists of pulling continuous lengths of fibers through a resin bath or impregnator and then into a preforming fixture where the geometric cross-section is initiated and excess liquid, or powder resin and air are removed and then into a progressively heated die where the sectional shape is cured continuously. Typically, the process is used to make fiber reinforced plastic, pultruded shapes. The "Handbook of Pultrusion Technology" by Raymond W. Meyer, first published in 1985 by Chapman and Hall, New York, provides a detailed discussion of pultrusion technology, the disclosure of which is totally incorporated herein by reference. In the practice of the present invention, conductive carbon fibers are submersed in a liquid polymer bath and drawn through a die opening of a suitable shape at high temperature to crosslink the liquid polymer and thereby produce a solid piece of dimensions and shapes of the die which can be cut, shaped, and machined into a desired electrical component. As a result of this pultrusion process, thousands of conductive fiber elements are contained within the polymer matrix whose ends can be exposed to provide electrical contact surfaces using the above-described laser cutting methods. This high degree of redundancy and availability of electrical point contacts to function independently enables a substantial improvement in the reliability of these devices. Since the plurality of small diameter conductive fibers, in the form of multi-filament carbon fiber tows, are pulled through the polymer bath and heated die as a continuous length, the shaped component is formed with the fibers being continuous from one end of the component to the other and oriented within the resin matrix in a direction substantially parallel to the axial direction of the component. By the term "axial direction" it is intended to define a lengthwise or longitudinal direction along the major axis of the configuration produced by the pultrusion process. Accordingly, the pultruded composite may be formed in a continuous length of the configuration during the pultrusion process and cut to any suitable dimension providing at more than one location a very large number of electrical point contacts. These pultruded composite components may have either one or both of the ends subsequently fibrillated.

Any suitable fiber may be used in the practice of the present invention. Typically, the conductive fibers are non-metallic and have a DC volume resistivity of from about $1 \times 10^{-5}$ to about $1 \times 10^{11}$ ohm-cm and preferably from about $1 \times 10^{-4}$ to about 10 ohm-cm to minimize resistance losses and suppress RFI. The upper range of resistivities of up to $1 \times 10^{11}$ ohm-cm could be used, for example, in those special applications involving extremely high fiber densities where the individual fibers act as individual resistors in parallel thereby lowering the overall resistance of the pultruded component enabling current conduction. The vast majority of applications however, will require fibers having resistivities within the above stated preferred range to enable current conduction. The term "nonmetallic" is used to distinguish from conventional metal fibers which exhibit metallic conductivity having resistivity of the order of $1 \times 10^{-6}$ ohm-cm and to define a class of fibers which are nonmetallic but can be treated in ways to approach or provide metal like properties, which include electrical conductivity and magnetic activity. Higher resistivity materials may be used if the impedance of the associated electrical circuit is sufficiently high. Lower resistivity materials may be used where high current carrying capacity or low contact resistance is desired. In addition, the individual conductive fibers are generally circular in cross section and have a diameter generally in the order of from about 4 to about 50 micrometers and preferably from about 7 to 10 micrometers which provides a very high degree of redundancy in a small cross sectional area. The fibers are typically flexible and compatible with the matrix. Typical fibers include carbon and carbon/graphite fibers but may include metal particle filled- or metal plated- glass, ceramic, carbon, pitch, and organic fibers.

A particularly preferred fiber that may be used are those fibers that are obtained from the controlled heat treatment processing to yield complete or partial carbonization of polyacrylonitrile (PAN) precursor fibers. It has been found for such fibers that by carefully controlling the temperature of carbonization within certain limits that precise electrical resistivities for the carbonized carbon fibers may be obtained. The carbon fibers from polyacrylonitrile precursor fibers are commercially produced by Graphil, Inc., Amoco Performance Products, Inc., and others in yam bundles of 1,000 to 160,000 filaments commercially referred to as "Tows." Metal plated carbon fibers are avalilable from Novamet Specialty. The Tows are typically carbonized in a two-stage process. The first stage involves stabilizing the melt spun and drawn PAN fibers at temperatures of the order of 300° C. in an oxygen atmosphere to produce "preox" PAN fibers ("preox" is the intermediate fiber resulting from this first stage of processing; it is black in color, relatively large in diameter, and nonconductive) followed by carbonization at elevated temperatures in an inert (nitrogen) atmosphere. The DC electrical resistivity of the resulting fibers is controlled by the selection of the temperature of carbonization. For example, carbon fibers having DC resistivities of $10^{-2}$ to about $10^{-6}$ ohm-cm result from treatment temperatures of up to 1800° to 2000° C. For further reference to the processes that may be employed in making these carbonized fibers, attention is directed to U.S. Pat. No. 4,761,709 to Ewing et al. and the literature sources cited therein at column 8. Typically these carbon fibers have a modulus of from about 30 million to 60 million psi or 205–411 GPa which is higher than most steels thereby enabling a very strong pultruded composite component. The typical high temperature conversion of the polyacrylonitrile fibers results in a fiber which is about 99.99% elemental carbon which is inert and will resist oxidation. The fiber may be an Amoco THORNEL™ carbon fiber such as T300™ and T650™ PAN.

One of the advantages of using conductive carbon fibers and metal plated carbon fibers is that they have a negative coefficient of thermal conductivity so that as the individual fibers become hotter with the passage of, for example, a spurious high current surge, the carbon becomes more conductive. This provides an advantage over conventional metal contacts since metals operate in just the opposite manner and therefore metal contacts tend to weld, burn out, or self destruct. The carbon fibers have the further advantage in that their surfaces are inherently rough and porous thereby providing good adhesion to the matrix. In addition, the inertness of the carbon material yields a contact surface relatively immune to corrosion when compared to most metals.

The matrix employed in the present invention may be polymerized from a composition including methyl methacrylate monomer (referred herein as "MMA") and a trimer (referred herein as "trimer") of hydroxyethyl methacrylate, diphenylmethane diisocyanate, and hydroxyethyl methacrylate. The MMA has the structural formula

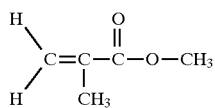

and the trimer has the structural formula

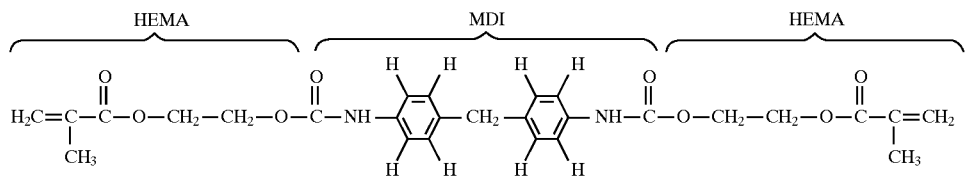

where HEMA is hydroxyethyl methacrylate and MDI is diphenylmethane diisocyanate. The MMA and the trimer preferably have a molar ratio ranging from about 7:1 to about 1:1, more preferably from about 5:1 to about 2:1, and especially about 4:1. The MMA and the trimer together may be present in an amount ranging from about 80% to about 97% by weight based on the matrix composition weight. The remaining substances, about 3% to about 20% by weight, may be for example other monomers or additives described herein.

The preferred matrix is MODAR 826HT™ resin wherein the MMA and the trimer are believed to have the molar ratio of about 4:1. The composition of MODAR 826HT™ resin is believed to be MMA (present in about 42% by weight), the trimer (present in about 50–55% by weight), and in addition there may be included an acrylic polymer (such as polymethyl methacrylate, present in about 1–5% by weight), flame retardants, for example alumina trihydrate, and small amounts of absorbed moisture (present in about 0.1 to 1.0% by weight).

Other materials may be added to the matrix bath to provide their properties such as lubricants, corrosion resistance, adhesion enhancement, or additional flame retardancy as desired. In addition, the polymer bath may contain fillers such as calcium carbonate, alumina, silica or pigments to provide a certain color, texture, or lubricants to reduce friction, for example, in sliding contacts. Further additives to alter the viscosity, surface tension or to assist in cross linking or in bonding the pultrusion to the other materials may be added. Naturally, if the fiber has a sizing applied to it, a compatible polymer should be selected. For example, if an epoxy resin is being used, it would be appropriate to add an epoxy sizing to the fiber to promote adhesion between the resin and the fibers.

The fiber types and loadings in the polymer matrix depends upon the conductivity and density of fiber contact points desired as well as on the cross-sectional area and other mechanical, physical, chemical, and magnetic properties of the final configuration. Typically, the unfilled polymeric matrix has a specific gravity of from about 1.1 to about 1.5 grams per cubic centimeter, while the carbon, metalized carbon, and polymeric type fibers have a specific gravity of from about 1.5 to about 2.2. Naturally, the specific gravity of metal and metal alloy fibers is much higher, for example, 6.0 to about 9.0. Typically, very high fiber concentrations, for example greater than 50% by weight and often greater than 75% by weight, are characteristic of the pultrusion process which requires a minimum overall fiber loading determined by factors such as; the shape, size and complexity of the pultruded component as well as the polymer type and viscosity, die design, process velocity and temperature. While the conductive fibers, for example, carbon fibers may be present in amounts as low as 1 to 5% by weight of the pultruded component to control the electrical conductivity of the composite at a prescribed low level for example $1 \times 10^{-1}$ ohm-cm, other non-conductive fibers, such as fiberglass fibers may be added to comprise the minimum requirements called for by the pultrusion process. In general, pultrusions with high loadings of carbon fiber are preferred to provide pultruded composites with the combination of high electrical conductivities, high densities of fiber contact tips, and desirable mechanical and other properties.

In embodiments, the electrical component includes Amoco T300™ 12k carbon fiber tow where 12k (viz.

12,000) is the number of individual carbon fibers contained within the tow used to make the pultrusion composite and the total loading of fiber is in the range of about 69% to about 76% by weight of the pultrusion composite. Other carbon fiber tows can be used, for example 1K, 3K, and 6K but 12K is preferred for pultrusion composites having cross sectional areas of about 25 square millimeters or larger, because a fewer number of tows is required to achieve the desired fill densities and thereby minimizes production costs. For smaller, cross sectional areas, for example in the range of 2 to 10 square millimeters, tow sizes of 1K, 3K, or 6K would be used. In order to assist with handling of the fiber tows during processing and to aid in wetting of the liquid matrix to the fibers, the carbon fibers are typically sized with a film forming organic polymer deposited from solution onto the surface of the fibers. For example, polyvinylpyrrolidone is a water soluble polymer suitable for sizing in some applications. For the composites of the present invention, the carbon fibers are preferably sized with Amoco UC-309™ resin which is a proprietary, matrix compatible, polymeric treatment that also helps increase the interlaminar shear strength of the composition. The sizing is preferably applied in low concentrations, for example, from about 0.2 to about 2.0% by weight of the fiber from a water emulsion during the fiber manufacturing process and is suitably dried to remove the water before packaging, shipping, and entering the pultrusion process. The preferred electrical component also includes MODAR 826HT™ (about 24%–30% by weight of electrical component) as the matrix available from Ashland Chemical Company, plus a small amount of a suitable lubricant such as polyethylene wax, for example, from about 0.1 to about 2% by weight of the starting pultrusion composition and a curing agent such as Noury PERCADOX 16N™ which is believed to be benzoyl peroxide (about 0.7% to 1% by weight of the starting pultrusion composition).

The pultruded composite components may be prepared according to the pultrusion technique as described, for example, by Meyer in "Handbook of Pultrusion Technology." In general, this will involve the steps of pre-rinsing the continuous multi-filament strand of conductive carbon fibers in a pre-rinse bath followed by pulling the continuous strand through the molten or liquid polymer in a contiuously mixing vessel followed by pulling it through a heated die which may be at, or above, the curing temperature of the resin into an oven dryer if such is necessary to a cut-off or take-up position. For further and more complete details of the process attention is directed to Meyer. The desired final shape of the pultruded composite component may be that provided by the die. Typically, the cross section of the pultrusion may be round, oval, square, rectangular, triangular, etc. In some applications, it can be irregular in cross section or can be hollow like a tube or circle having the above shapes. Other configurations allowing mixed areas of conducting and non-conducting fibers as well as mixed areas of magnetic and non-magnetic fillers are also possible. The pultrusion is capable of being machined with conventional carbide tools according to standard machine shop practices. Typically, holes, slots, ridges, grooves, convex or concave contact areas or screw threads may be formed in the pultruded composite component by conventional machining techniques. Alternatively, the pultrusion process may be modified such that when the pultrusion is initially removed from the die it is pliable and can be bent or otherwise shaped to a form which upon further curing becomes a rigid structural member. Alternatively, if the pultrusion resin is a thermoplastic the process can be adjusted such that the part is removed hot from the die, shaped, then cooled to solidify.

Typically, the fibers are supplied as continuous filament yarns having, for example, 1, 3, 6, 12 or up to 160 thousand filaments per yarn. Typically the fibers provide in the formed pultruded component from about $1 \times 10^3$ (a nominal 10–12 micrometer diameter fiber at 70–75% by weight loading in the pultrusion) to about $1 \times 10^7$ (a nominal 4 micrometer diameter fiber at 90% by weight loading in the pultrusion) point contacts per $cm^2$.

The electrical component having the high redundancy electrical contact surface of individually acting fibers may be fibrillated by any suitable technique. Typical techniques for fibrillating the pultruded component include heat removal of the polymer matrix at the end of the pultruded component. In a preferred embodiment, fibrillation is carried out by exposure to a laser beam. In this heat removal process, the polymer matrix should have a significantly lower melting or decomposition point than the fibers. The removal should be substantially complete with no significant amount of residue remaining. Typically the pultruded member is supplied in a continuous length and is formed into a fibrillated contact of much smaller dimension so that the laser is used to both cut individual components from the longer length and at the same time fibrillate both severed ends providing a high redundancy fiber contact for the advanced pultruded component downstream and a high redundancy fiber contact on the upstream end of the second pultruded component. Typically, the lasers employed are those which the polymer matrix will absorb and thereby volatilize. They should also be safe, have high power for rapid cutting having either pulsed or continuous output and be relatively easy to operate. Specific lasers include a carbon dioxide laser, or a carbon monoxide laser, a YAG laser or an argon ion laser with the carbon dioxide laser preferred as it is highly reliable and best suited for polymer matrix absorption and to manufacturing environments and is most economical. The following example illustrates one way of fabricating the present electrical component.

Pultrusions in the shape of a rod 2.5 mm in diameter made from carbon fibers about 8 to 10 micrometers in diameter and having a resistivity of 0.001 to 0.1 ohm-cm present in a matrix composed of MODAR 826HT™ to a density greater than 10,000 fibers per $cm^2$ are exposed to an (Adkin Model LPS-50) laser focused to a 0.5 mm spot, 6 watts continuous wave while the rod is slowly rotated about the rod axis at about 1 revolution per second. After about 100 seconds of exposure in one step the laser cleanly cut the pultrusion and uniformly removed the matrix up to a few millimeters from the filament ends (of both pieces) leaving an "artist brush" tip connected to the rigid conducting pultrusion as shown in FIG. 1. Furthermore, while the preferred embodiment has been described with reference to a one step laser cut and fibrillating process, it will be understood that the cutting and fibrillating steps may be performed separately and in succession.

Using a larger $CO_2$ laser (Coherent General model Everlase 548) operating at 300 watts continuous wave and scanning at about 7.5 cm/min a 1 mm diameter pultrusion made from the same materials is cut and fibrillated in less than one second.

Attention is directed to FIGS. 1, 2 and 3 which illustrate a preferred embodiment of an electrical component according to the present invention having a fibrillated brush structure at one end region of the composite component which provides a densely distributed filament contact with an electrically contacting surface. With the above-described composite component it will be understood that the brush structure has a fiber density of at least 1000 fibers/$cm^2$ to provide the high level of redundancy of electrical contact. It will be appreciated that such a level of fiber density is not capable of being accurately depicted in FIGS. 1, 2, and 3. FIG. 1 however, does illustrate that the fibers of the brush structure have a substantially uniform fiber length and that there is a well defined zone of demarcation between the brush structure and the portion of the composite component including the matrix which is enabled through the precision control of the laser, the water jet, or the acid etch process, which can selectively remove the matrix from the end region.

FIG. 1, FIG. 2 and FIG. 3 illustrate an electrical component wherein the fibers of the brush structure have a length much greater than five times the fiber diameter and are therefore generally resiliently flexible behaving elastically as a mass when deformed. This type of electrical component would find utility in those applications where it is desirable to have a contact of resiliently flexible fibers such as a sliding contact, commutator brush. In these contacts it should be noted that the individual fibers are so fine and resilient that they will stay in contact with another contacting surface and result in a low contact resistance even at low contact loads of as little as 5 to 50 grams. Therefore they can experience bounce without disruption of the electrical contact such as frequently may happen with traditional metallic contacts. Accordingly, they continue to function despite minor disruptions in the physical environment such as bounce and vibration. This type of macro fibrillation is to be distinguished from the more micro fibrillation wherein the length of fiber extending beyond the matrix resin is minimal and wherein the fibers in the brush structure have a length shorter than about five times the fiber diameter and the terminating ends provide a relatively rigid and nondeformable contacting surface. With this component, there will be a minimal deflection of the individual fibers and this configuration will therefore find utility in applications requiring stationary or nonsliding, mateable contacts such as in switches, sensors, and connectors. Nevertheless, the micro embodiment provides a highly reliable contact providing great redundancy of individual fibers defining the contacting surface. It is particularly important in this micro embodiment that a good zone of demarcation between the matrix section and the brush structure be maintained to provide a clean, resin-free contact and mating face with the other surface.

The phrase zone of demarcation refers to that portion of the composite component between where the matrix is fully or mostly removed from the contact region and the section of the composite where no matrix material has been removed. The particular matrix removal process employed affects the gradation of the remaining matrix material in the zone of demarcation. In the zone of demarcation created by the 6 W and 300 W $CO_2$ lasers described above, a small volume of the component is raised substantially in temperature upon contact with the light induced heat produced by the laser. The heat is hot enough to initiate cutting of the carbon fiber as well as decomposition and vaporization of the matrix resin and fiber. The heat spreads from the hot, initial contact zone to the colder bulk of the composite material due to the thermal conductivity of the material energy in the laser spot, and time of exposure. The temperature profile along the length of the component created during the dynamic heating results in complete resin removal for a specific length and then a gradation of decomposed and vaporized matrix material within the zone of demarcation. As used herein, the phrase "free fiber length" refers to the length of the fibers in the brush structure of the composite component from which the matrix resin has been removed. Any suitable free fiber length up to an inch or more may be used. However, a free fiber length greater than about 5 to 10 millimeters may be impractical as being too costly to both remove and waste the matrix compared to other conventional assembly techniques for brush structures. For electrostatic and other electrical and electronic applications a free fiber length of from about 0.005 to about 3 millimeters is preferred. In the micro embodiment, where the free fibers are for example less than about 10 microns in diameter, the contact end is relatively hard and thereby feels like a solid to the touch because the fibers are too short to be distinguished from the component. However, in the macro embodiment where the free fiber length is greater than about 0.25 mm, the fibrillated contact end is soft and feels like a fuzzy velour or artist's brush.

The fibrillated component may be used to provide at least one of the contacting components in a device for conducting electrical current, the other contacting component being selected from conventional conductors and insulators. In addition or alternatively, both of the contacts may be made from similar or dissimilar inventive composite components and inventive fibrillated composite components. Alternatively, one contact may be a composite component but not fibrillated. One contact may be macro fibrillated and the other micro fibrillated. Furthermore, one or both of the electrical components may provide a mechanical or structural function. For example, in addition to performing as a conductor of current for a connector, the solid portions (i.e., containing the matrix) of a fibrillated composite component may also function as a mechanical member such as a bracket or other structural support or as a mechanical fastener for a crimp on a metal connector or may be flexible and act as a spring or lever member. A portion of a fibrillated composite component may provide mechanical features such as a guide rail or pin or stop member or as a rail for a scanning head to ride on and also provide a ground return path while providing a magnetic force that may act upon another component, or components, such as in a position sensor or brake. Accordingly, functions can be combined and parts reduced and, in fact, a single piece can function as electrical contact, magnetic actuator, and structural support member for itself and an electrical connection.

With reference to FIG. 4, there is shown in a path of movement of a document 16 through a document sensor device 66. The document sensor 66 generally includes a pair of oppositely disposed conductive contacts. One such pair is illustrated as a fibrillated brush having the electroconductive fibers 68 carried in upper support 70 in electrical contact with composite component 72 carried in lower conductive support 74 which is mounted on base 76. The lower composite component comprises a plurality of conductive fibers 71 in a matrix comprising the resin 75. Fibrillation of the contact end is performed to define surface 73 comprised of free fiber tips with the one end of the fibers being available for contact with the fibers of the fibrillated brush 68 which is mounted transversely to the sheet path to contact and be deflected by passage of a document between the contacts. When no document is present, the fibrillated brush fibers 68 form a closed electrical circuit with the surface 73 of the composite component 72. Obviously, when paper passes though the fiber contact, it comes into direct contact with many carbon fibers that, in the absence of this invention, or a costly post-process cleaning, would have matrix residue along their free fiber length resulting from laser fibrillation. Since the desired state is where no debris from the contact should transfer to the sheet and thereby cause staining of the sheet, the preferred matrix resin is one that does not produce the residue during laser processing and thereby avoids the cost of post-process cleaning and eliminates the probability of staining the copy sheet.

Attention is directed to FIG. 5 wherein a side view schematic of a photoconductor grounding brush 29 is illustrated with the photoconductor 10 moving in the direction indicated by the arrow. A notch or "V" is formed in the matrix portion of the grounding brush since the moving photoconductor belt can have a seam across the belt which is insulative at its apex and thereby would potentially disrupt the grounding operation by lifting the grounding brush off of the conductive region of the photoconductor. To avoid this problem, this geometry provides two fibrillated brush structures which are separated by the space of the notch or "V". To avoid the likelihood of resin matrix residue transferring to and contaminating the photoconductor belt, or, the solid residue causing abrasive wear of the photoconductor belt, the use of the present invention is preferred.

Thus, according to the present invention an electrical component having a densely distributed filament contact providing a very high redundancy of available point contacts is provided which is orders of magnitude greater than conventional metal to metal contacts. Further, a highly reliable low cost, long wearing electrical component that can be designed for serviceability which can be of controlled resistance, immune to contamination, nontoxic, and environmentally stable has been provided. It is capable of functioning for very extended periods of time in low energy configurations and can be used in high power applications. In addition, in the preferred embodiment the pultruded member can be cut into individual contacts and simultaneously fibrillated to provide a finished contact whose free fiber length can be closely controlled and the zone of demarcation between the pultruded portion and its free fibers well defined because the laser can be precisely controlled and focused in a programmable manner. Furthermore in addition to being capable of one step automated manufacturing the component can combine electrical function with mechanical or structural function.

The invention will now be described in detail with respect to specific preferred embodiments thereof, it being understood that these examples are intended to be illustrative only and the invention is not intended to be limited to the materials, conditions, or process parameters recited herein. All percentages and parts are by weight unless otherwise indicated. The residue rankings mentioned in these examples used the residue ranking system described herein.

EXAMPLE 1

A sample of MODAR 826HT™ resin was cured into a rectangularly shaped block of approximately 0.5 inch wide, 0.5 inches long, and 0.125 inches thick. To facilitate handling during laser processing and subsequent residue analysis, the MODAR 826HT specimen block was mounted with one flatside-down onto the upper surface of a 1 inch wide, 3 inch long glass microscope slide with use of double backed adhesive tape and the upper surface of the specimen was subjected to a Synrad 80 watt $CO_2$ laser beam attenuated to the 4% power output level which equates to about 1 watt of output power and sufficient scan speed to cut a shallow, narrow channel of about 0.5 mm wide and 0.5 to 1 mm depth along the entire length of the specimen's surface. These mild laser conditions were chosen such that the specimen was not cut entirely through as would be normally the case when laser cutting a distributed filament contact. Owing to the fact that there was no fiber in the resin used for this test, the selected laser conditions facilitated the residue analysis by visual and micrographic inspections because residue, if any, could reside in several locations, namely: alongside and outside the cut region, on the sides of the groove, or at the bottom of the groove. This increased the likelihood of observing residue accumulated on the specimen which was viewed to be a stress case for this phenomenon. Upon observation for cut quality and analysis for residue, the region of the sample contacted by the laser beam exhibited a clean cut for the entire length and depth of the groove. The width of the cut was very uniform, the walls of the groove were parallel and well defined with no debris observed within the groove. No char was detected even when viewed at 50 to 200× magnifications. A slight amount of residue was found accumulated along side of the groove residing upon the upper surface and extending a distance of about 0.5 to 1.5 mm from the edge of the groove. These observations resulted in a residue ranking of 1 on the earlier-described numerical scale. While the residue did not contain char, it did exhibit a noticeable amount of resin by-products that appeared to have received sufficient laser energy to vaporize but then sublimed onto nearby surfaces.

COMPARATIVE EXAMPLE 1

A sample of EPON 9405™ resin (a bisphenol A epoxy with a reactive monomer) available from Shell Chemical Company was cast into the same size specimen and subjected to the same laser beam using the procedures described in Example 1. The region of the sample contacted by the laser beam, in this case exhibited a uniform cut within the groove but the edges revealed heavy presence of tacky film residue. The evaluation for char was complicated because of the dark color of this sample. Because of the amount of tacky film residue this sample received a residue ranking of 2.

COMPARATIVE EXAMPLE 2

A similarly sized sample of RSL 2384™ resin (a bisphenol A epoxy with a reactive monomer) available from Shell Chemical Company was subjected to a laser beam using the procedures described in Example 1. The region of the sample contacted by the laser beam exhibited a less than perfectly uniform cut, presence of a moderate amount of tacky film residue and a slight amount of char thereby receiving a residue ranking of 3.

COMPARATIVE EXAMPLE 3

A sample of RSC 1846™ resin (a bisphenol A epoxy with a reactive monomer) available from Shell Chemical Company was subjected to a laser beam using the procedures described in Example 1. The region of the sample contacted by the laser beam exhibited a residue ranking of 3.

COMPARATIVE EXAMPLE 4

A sample of MODAR 865™ resin (this material is believed to be prepared from a composition including methyl methacrylate monomer and a trimer of hydroxyethyl methacrylate, diphenylmethane diisocyanate, and hydroxyethyl methacrylate, where the methyl methacrylate monomer and the trimer are believed to have a molar ratio of 10.1:1) available from Ashland Chemical Company was subjected to a laser beam using the procedures described in Example 1. The region of the sample contacted by the laser beam exhibited a residue ranking of 4 and showed the presence of char in the residue.

COMPARATIVE EXAMPLE 5

A sample of ATLAC 580™ resin (a urethane modified bisphenol vinyl ester) available from Reichhold Chemical Inc. was subjected to a laser beam using the procedures described in Example 1. The region of the sample contacted by the laser beam exhibited a highly distorted and ragged cut and revealed the presence of a large amount of tacky film residue that extended from about 1 to 2 mm along side of the cut The residue ranking was 4.

COMPARATIVE EXAMPLE 6

A sample of DION 31-020-01™ resin, containing a proprietary polyester resin and a styrene monomer, available from Reichhold Chemical Inc. was subjected to a laser beam using the procedures described in Example 1. The region of the sample contacted by the laser beam exhibited appearance similar to comparative examples 5 and 7 and received a residue ranking of 4.

COMPARATIVE EXAMPLE 7

A sample of MI-$_{3300}$™ resin, believed to be an isophthalic resin, available from Interplastic Corp. was subjected to a laser beam using the procedures described in Example 1. The region of the sample contacted by the laser beam exhibited a residue ranking of 4.

COMPARATIVE EXAMPLE 8

A sample of 8084™ resin, a vinylester resin, available from Dow Plastics was subjected to a laser beam using the procedures described in Example 1. The region of the sample contacted by the laser beam exhibited a very distorted and ragged cut plus the presence of char along the walls and bottom of the groove and heavy tacky film residue extending 2 to 3mm from the cut producing a residue ranking of 5.

EXAMPLE 2

The procedures of Example 1 were repeated on a fresh sample of MODAR 826HT resin. The laser processed sample was subjected to a verification analysis and revealed identical results. Therefore a residue ranking of 1 was assigned.

Thus, we see from this series of critical experiments that the present invention composition exhibited much less residue contamination than the comparative putrusion resins.

Other modifications of the present invention may occur to those skilled in the art based upon a reading of the present disclosure and these modifications are intended to be included within the scope of the present invention.

I claim:

1. An electrical component having at least one end for making electrical contact with another component, comprising a plurality of electrically conductive fibers in a matrix to provide a plurality of electrical point contacts at the at least one end of the electrical component, wherein the matrix is prepared from a composition including methyl methacrylate monomer and a trimer of hydroxyethyl methacrylate, diphenylmethane diisocyanate, and hydroxyethyl methacrylate, wherein the electrical component has a laser processed region at least substantially free of the matrix, wherein there is minimal residue generated by the laser processing in removing the matrix from the laser processed region, wherein the methyl methacrylate monomer and the trimer have a molar ratio ranging from about 7:1 to about 1:1.

2. The electrical component of claim 1, wherein the electrical component has an axial direction and two ends, wherein the plurality of the fibers are oriented in the matrix in a direction substantially parallel in the axial direction of the electrical component and the plurality of the fibers are continuous from one end of the component to the other end.

3. The electrical component of claim 1, wherein the methyl methacrylate monomer and the trimer have a molar ratio ranging from about 5:1 to about 2:1.

4. The electrical component of claim 1, wherein the methyl methacrylate monomer and the trimer have a molar ratio of about 4:1.

5. The electrical component of claim 1, wherein the laser processed region is a brush structure that is disposed at the at least one end of the electrical component.

6. The electrical component of claim 1, wherein the fibers are carbon fibers or carbonized polyacrylonitrile fibers.

7. The electrical component of claim 1, wherein the electrical component is prepared by pultrusion.

8. An electrical device for conducting electrical current comprising two contacting components, at least one of the components having an axial direction and two ends and comprising a plurality of electrically conductive fibers in a matrix, the plurality of the fibers being oriented in the matrix in a direction substantially parallel in the axial direction of the component and being continuous from one end of the component to the other end to provide a plurality of electrical point contacts at each end of the component, wherein the matrix includes a composition polymerized from a methyl methacrylate monomer and a trimer of hydroxyethyl methacrylate, diphenylmethane diisocyanate, and hydroxyethyl methacrylate, wherein the electrical component has a laser processed region at least substantially free of the matrix, wherein there is minimal residue generated by the laser processing in removing the matrix from the laser processed regions, wherein the methyl methacrylate monomer and the trimer have a molar ration ranging from about 7:1 to about 1:1.

* * * * *